United States Patent [19]

Rifkin et al.

[11] Patent Number: 4,555,749
[45] Date of Patent: Nov. 26, 1985

[54] LED CIRCUIT BOARD INDICATOR HOUSING AND TIE-BAR ASSEMBLY

[75] Inventors: Gary L. Rifkin, Gurnee; Charles C. Lawrence, Chicago; Sam Zilber, Skokie; Michael Hamby, Chicago, all of Ill.

[73] Assignee: General Instrument Corporation, New York, N.Y.

[21] Appl. No.: 607,673

[22] Filed: May 7, 1984

[51] Int. Cl.⁴ .............................................. F21V 21/14
[52] U.S. Cl. .................................. 362/249; 362/365; 362/368; 362/382; 362/800
[58] Field of Search ............... 362/800, 249, 250, 285, 362/362, 365, 366, 368, 457, 84, 217, 219, 382, 389; 29/413; 52/594

[56] References Cited

U.S. PATENT DOCUMENTS

| 3,082,397 | 3/1963 | Clarkson et al. | 29/413 |
| 3,540,687 | 11/1970 | Cuva | 362/249 |
| 3,927,315 | 12/1975 | Werry | 362/382 |
| 4,471,415 | 9/1984 | Larson et al. | 362/800 |

FOREIGN PATENT DOCUMENTS 2814877 10/1979 Fed. Rep. of Germany ...... 362/800

Primary Examiner—Magdalen Y. C. Moy
Attorney, Agent, or Firm—Barry R. Lipsitz

[57] ABSTRACT

A tie-bar of variable length for mechanically linking a desired number of lamps (such as LEDs) includes dove-tailed channels with a "V-shaped" groove in each dovetail channel. Each lamp is disposed in a housing having a compatible dove-tailed mounting channel designed to fit half of adjacent tie-bar channels on the tie-bar assembly. The "V-shaped" grooves are used to break the tie-bar to a desired length for mounting a required number of lamp housings.

9 Claims, 4 Drawing Figures

U.S. Patent  Nov. 26, 1985  4,555,749
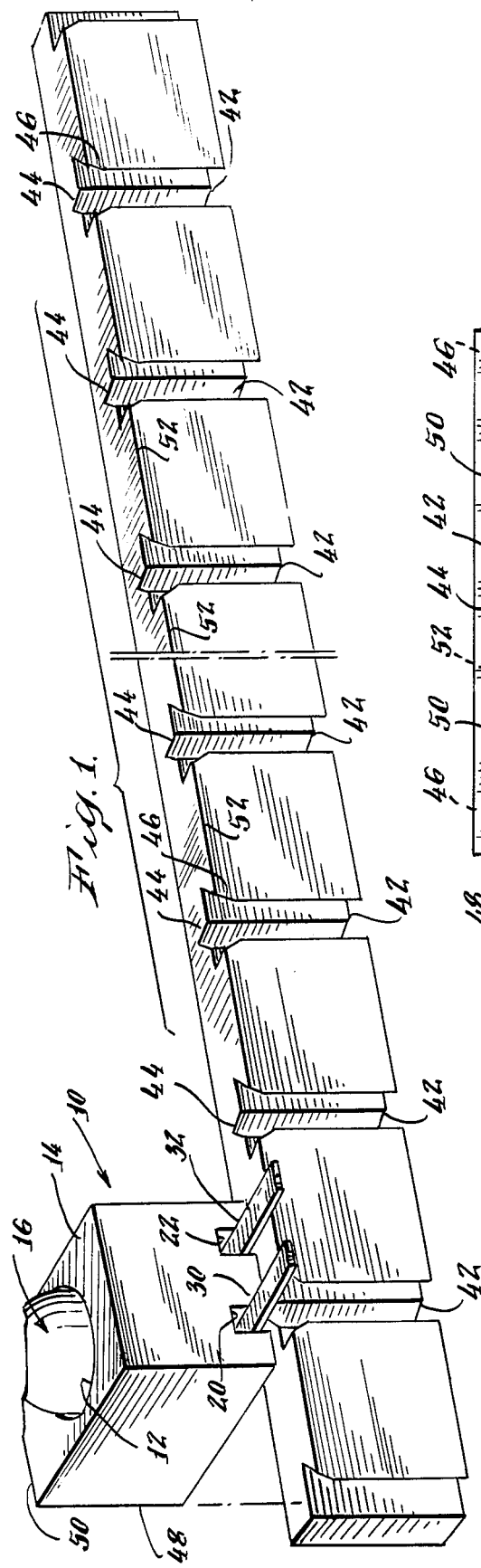
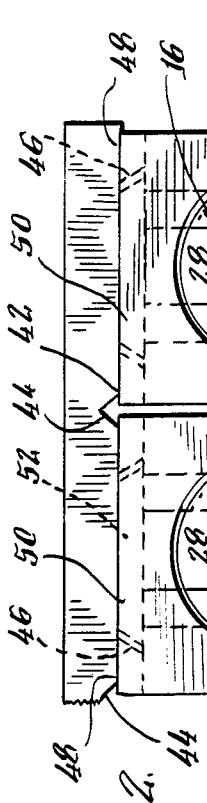
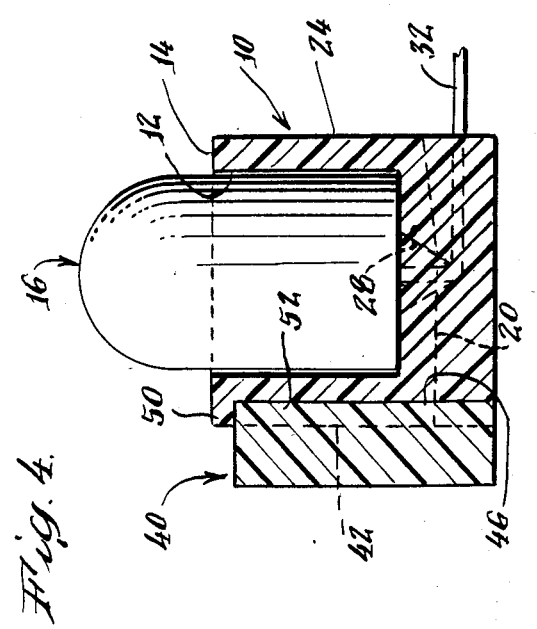
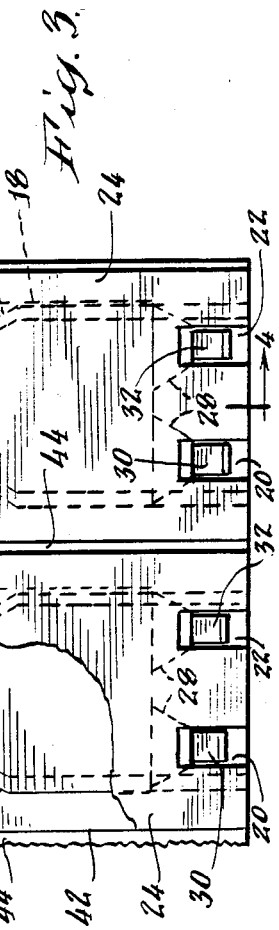

LED CIRCUIT BOARD INDICATOR HOUSING AND TIE-BAR ASSEMBLY

BACKGROUND OF THE INVENTION

1. Field Of The Invention

This invention relates to a circuit board display consisting of a plurality of lamps (such as light emitting diodes or "LED"s) arranged in tandem to provide the display, and more particularly, a circuit board display utilizing a variable length tie-bar for supporting any deisred number of the lamp housings in tandem.

2. Description Of The Prior Art

It has been common to utilize a series of LED lamps as part of a metering circuit. For example, a number of lamps have been provided in a single housing to form a graduated scale or bar graph utilized to meter audio output equipment wherein by lighting or activating one or more of the LED lamps a visual display of the decibel level of the audio equipment can be had.

However, the LED lamps are housed within a single unit and the use of a variable number of the lamps less than those housed within the unit is awkward and wasteful.

SUMMARY OF THE INVENTION

In accordance with the present invention a lamp such as an LED is supported within an individual housing or base having two square, chamfered holes in communication with two interior channels for receiving the LED's wires which are passed through the two holes, cut to a specific dimension, bent 90 degrees, and then pushed into the two channels. The LED will then remain seated in an opening in the front wall of the housing or base.

A locking tie-bar of variable length is provided for mechanically linking a desired number of the LED lamp housings. The tie-bar includes a series of spaced dove-tailed channels along its length with a "V-shaped" groove cut in each dove-tailed channel. The rear side wall of each individual LED base or housing has a compatible dove-tail channel to fit into half of two adjacent tie-bar channels. The resulting, interengaging structure of the tie-bar and LED housing comprises, in effect, a mortise and tenon arrangement for mounting the LED housing to the tie-bar. The tie-bar can be broken to a desired length linking any given number of the LEDs together by breaking the tie-bar along any one of the weakening "V-shaped" grooves formed in the tie-bar.

Not only does the tie-bar assembly enable any given number of LEDs to be linked, but they can be arranged in different color combinations as desired. The LED bases or housings being interlocked allows the user to insert the entire assembly into any printed circuit board which will save time and labor. The LED array tied together is particularly useful in equipment in which a graduated scale or bar graph display is desired.

BRIEF DESCRIPTION OF THE DRAWING

Further objects and advantages of the present invention will be made more apparent from the following description and claims, and from the accompanying drawing, wherein:

FIG. 1 is an exploded perspective view of a circuit board LED indicator base or housing of the present invention and a tie-bar assembly for mounting a number of such bases or housings;

FIG. 2 is a top plan view of two LED housings mounted on a segment of the tie-bar assembly of FIG. 1 which has been broken off the tie-bar of FIG. 1;

FIG. 3 is a front view in elevation of the fragment of the combined tie-bar assembly and LED housings illustrated in FIG. 2; and FIG. 4 is a cross-sectional view taken substantially along the plane indicated by line 4—4 of FIG. 3.

DESCRIPTION OF THE PREFERRED EMBODIMENT

Referring now to the drawing in detail, wherein like numerals indicate like elements throughout the several views, a housing 10 is provided having an annular cavity 12 opening in the front wall 14 thereof for receiving an LED lamp generally indicated by the numeral 16. It is noted that other types of lamps, such as neon or incandescent lamps, can be substituted for the LED shown. The lamp 16 is disposed within the cavity 12. The housing 10 is a substantially cubic block which may be formed from plastic material such as nylon.

A housing 10 has a pair of square channels 20 and 22 formed in a side wall surface 24 thereof of housing block 10. The channels 20 and 22 lead to chamfered holes 28 in the interior of housing 10 which in turn lead to the annular cavity 12 which holds LED lamp 16. The LED lamp's wires 30, 32 may be passed through the holes 28, across their respective connecting channel 20, 22, cut to specific dimension, and if desired bent 90 degrees, and pushed into the respective channel 20, 22 for retention therein.

A tie-bar generally indicated by the numeral 40 of any desired length is provided for mechanically linking a desired number of the LED lamps 16 mounted in LED lamp housings 10. The tie-bar 40 includes a plurality of longitudinally spaced dove-tailed channels 42 along the length of the tie-bar. Each of the channels 42 exposes a "V-shaped" groove 44 cut across the height of the tie-bar 40 at the center of each of the dove-tailed channels 42. The side walls of the groove 44 are substantially perpendicular to each other.

Each of the housings 10 is provided with a complementary shaped dove-tail channel 46 formed in a side surface 48 of housing 10 beneath a horizontally extending support ledge 50. Each of the housings 10 is assembled and supported on the tie-bar 40 by inserting and sliding the groove 46 in telescoping fashion over the extension 52 of the tie-bar 40 between each half of adjacent ones of the tie-bar channels 42 as illustrated in FIGS. 2 and 3, until the horizontally extending ledge 50 seats and is supported on top of the extension 52.

As shown in FIGS. 2 and 3, if it is desired to use less than the total array of LEDs which can be mounted on the tie-bar assembly 40, it is only necessary to break the tie-bar 40 at one of the grooves 44 so that a segment of the tie-bar is used which has less than the total number of LED lamps which can be mounted thereon. Accordingly, one or more of the housings may be simply utilized with a printed circuit board, as desired, by simply fracturing the tie-bar 40 along one of the grooves 44.

What is claimed as new is as follows:

1. The assembly of at least one circuit board indicator lamp housing and a tie-bar for mounting a plurality of said lamp housings, said assembly comprising:

a plurality of dove-tail channels provided at spaced locations along the length of said tie-bar, and said housing including a complementary shaped dove-tailed channel on a surface thereof adapted to be slidingly received between one half of each of an adjacent pair of said spaced tie-bar dove-tail channels.

2. The assembly of claim 1 including a substantially V-shaped groove extending along the height of said tie-bar at each location spaced along said tie-bar corresponding to each of said dove-tailed channels.

3. The assembly of claim 1 wherein said housing includes a horizontal ledge formed and extending over the dove-tail channel therein for seating on top of said tie-bar when said housing is slidably received on said tie-bar.

4. The assembly of claim 3 wherein each housing includes a cavity for receiving an LED indicator.

5. The assembly of claim 4 wherein each housing includes a pair of channels opening in a side surface thereof intersecting an opening within the interior of said housing beneath said cavity.

6. A tie-bar for mounting a plurality of lamp housings comprising:

a plurality of dove-tailed channels provided at spaced locations along the length of said tie-bar, and a substantially "V-shaped" groove extending along the height of said tie-bar at each location spaced along said tie-bar corresponding to each of said dove-tailed channels.

7. A lamp housing comprising:

a block having a cavity formed in the front surface thereof for receiving a lamp, a dove-tail shaped channel formed in a side surface thereof, and a horizontal ledge extending over said dove-tail channel formed in said side surface.

8. The housing of claim 7 wherein said block further includes a pair of channels opening in a side surface thereof intersecting an opening within the interior of said housing beneath said cavity.

9. The housing of claim 7 wherein said lamp housing is adapted to receive an LED lamp.

* * * * *